Patented Feb. 27, 1923.

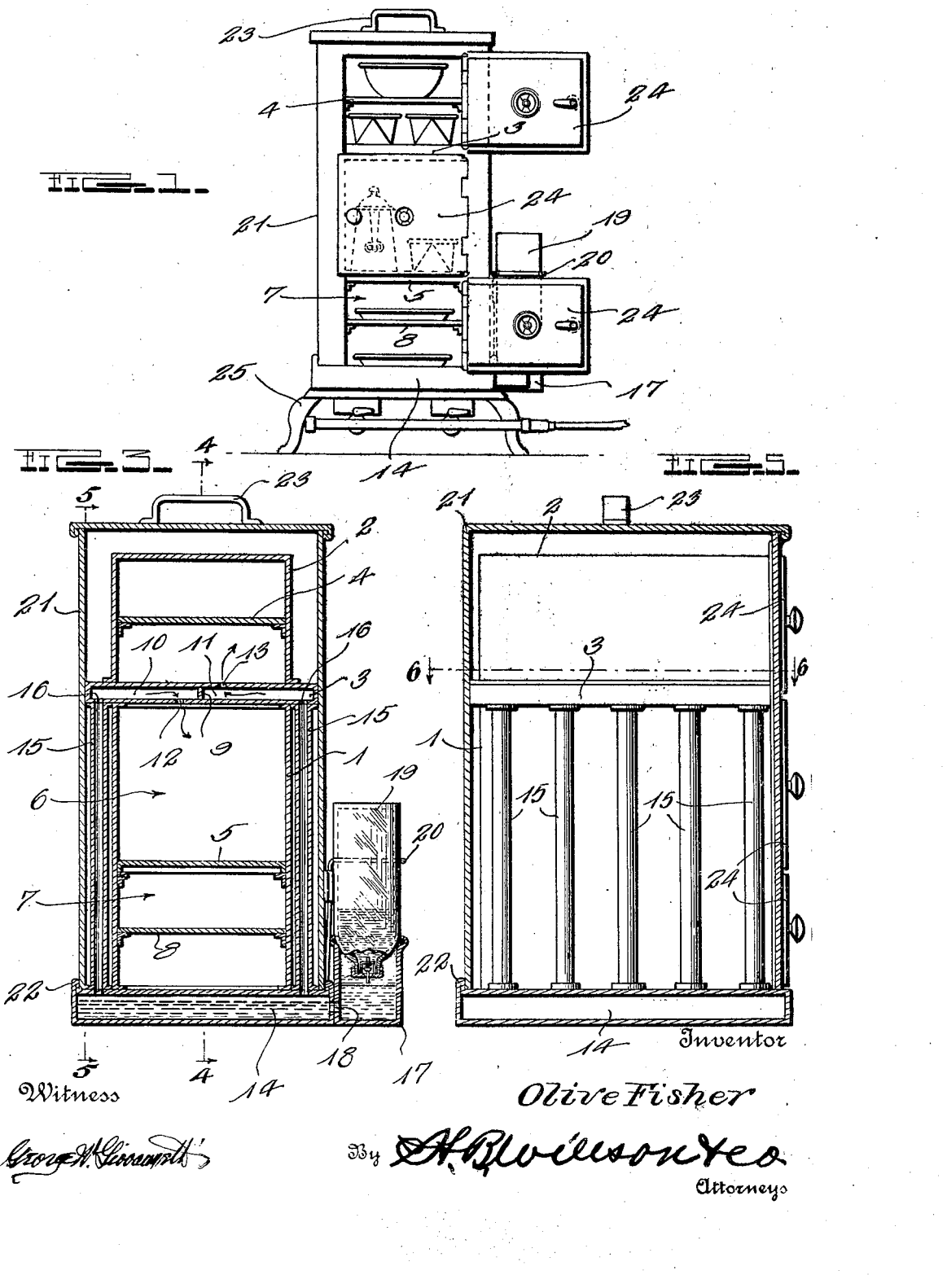

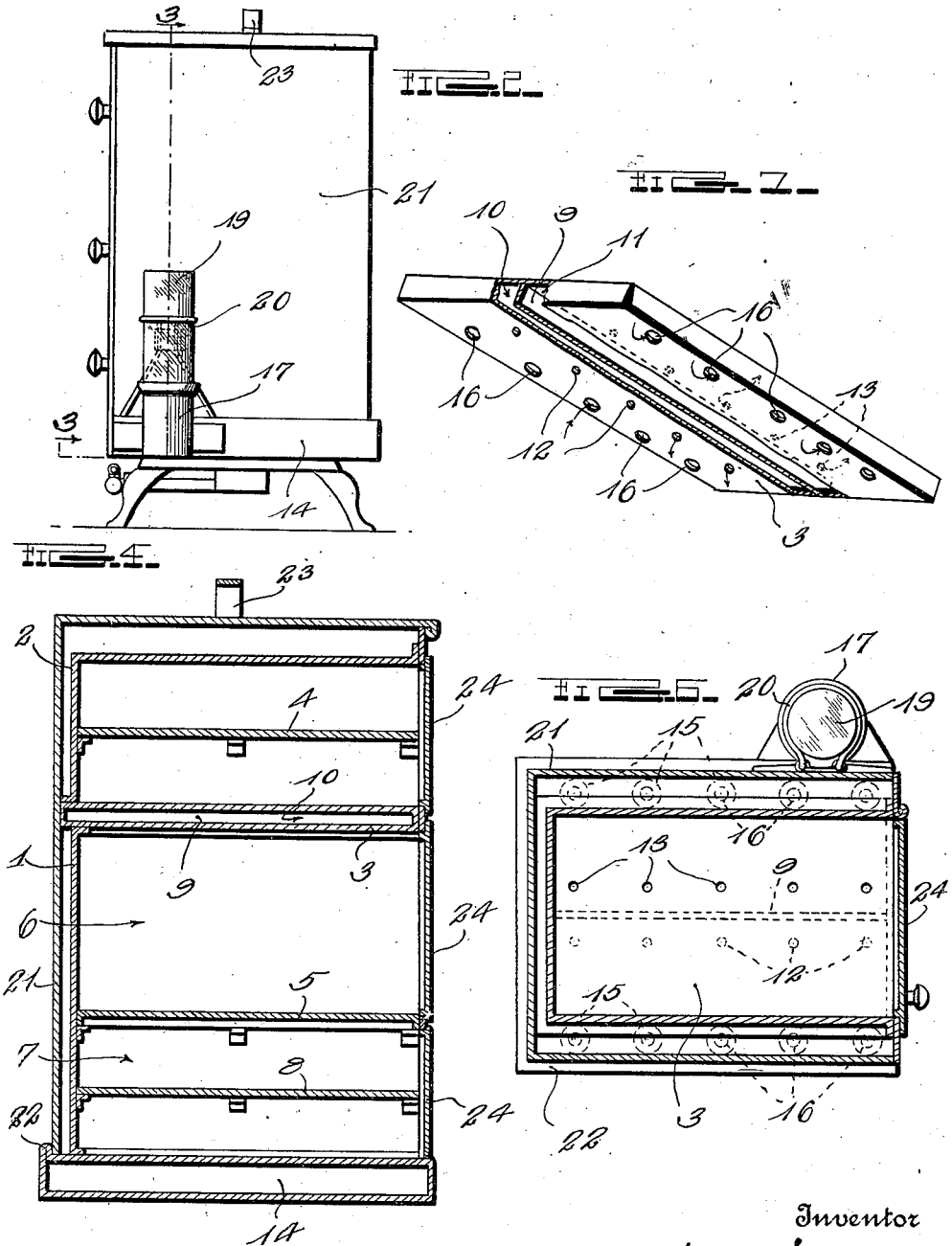

1,447,067

UNITED STATES PATENT OFFICE.

OLIVE FISHER, OF TIPTON, INDIANA, ASSIGNOR OF ONE-HALF TO EMMA RADER, OF OTTERBEIN, INDIANA.

COOKER.

Application filed August 8, 1921. Serial No. 490,674.

*To all whom it may concern:*

Be it known that I, OLIVE FISHER, a citizen of the United States, residing at Tipton, in the county of Tipton and State of Indiana, have invented certain new and useful Improvements in Cookers; and I do declare the following to be a full, clear, and exact description of the invention, such as will enable others skilled in the art to which it appertains, to make and use the same.

This invention relates to an improved cooker which resembles an oven and is adapted for use in connection with a stove of the gas or oil burning type in which the cooker is placed upon the stove and is heated by the flames from the burners of the stove.

One object of the invention is to provide a cooker in which articles may be cooked by dry heat or by steam, one compartment of the cooker being provided for cooking by dry heat and the remaining compartment being provided for cooking by steam.

Another object of the invention is to provide an improved means for generating steam and admitting the steam to the steam compartment.

Another object of the invention is to so construct this cooker that the water receptacle holding the water from which the steam is to be generated may form the base of the cooker, the water receptacle or base being connected with a steam chamber between the steam cooking compartments by means of conduits positioned outside the body of the cooker.

Another object of the invention is to so construct the cooker that an outer jacket may be provided for enclosing the body and steam conduit, the outer jacket resting upon the base or water receptacle.

Another object of the invention is to so construct this cooker that the outer jacket may form forward walls for the cooking compartment, doors being provided for closing the entrances to these cooking compartments.

This invention is illustrated in the accompanying drawings, wherein:

Figure 1 is a view showing the improved cooker in front elevation with certain of the doors swung to an open position.

Figure 2 is a view showing the cooker in side elevation and the doors closed.

Figure 3 is a vertical sectional view taken along the line 3—3 of Fig. 2.

Figure 4 is a vertical sectional view taken along the line 4—4 of Fig. 3.

Figure 5 is a vertical sectional view taken along the line 5—5 of Fig. 3.

Figure 6 is a transverse sectional view taken along the line 6—6 of Fig. 5.

Figure 7 is a perspective view of the steam chamber.

This improved cooker is provided with a body portion having a lower section 1 and an upper section 2 separated from the lower section by a steam chamber 3, the steam chamber extending beyond the sides of the upper and lower sections and also extending at the rear thereof as shown in Figs. 3 and 5. The upper steam cooking compartment is provided with a dish supporting shelf or platform 4 in the present illustration, but this is not necessary and the shelf will be removable so that when desired, it can be removed thus permitting tall food receptacles to be placed in the compartment. The steam cooking compartment 1 may also be provided with a shelf if so desired but a shelf is not illustrated. A flooring 5 is provided within the body for the steam cooking compartment 6 in the upper portion and fits tightly within the body so that steam cannot pass down into the lower compartment 7 where food is to be cooked by means of dry heat. A shelf 8 is shown in this lower compartment 7, the shelf 8 being removable if so desired. It will thus be seen that there has been provided a body having a lower cooking compartment 7 where food will be cooked by dry heat, and there has further been provided upper food cooking compartments 6 and 2 in which food will be cooked by steam, the upper compartments being separated by the steam chamber 3. This steam chamber is provided with a partition 9 dividing the same into end compartments 10 and 11, the compartment 10 being provided with outlet openings 12 communicating with the lower compartment 6 and the compartment 11 having openings 13 for communication with the upper compartment 2.

The base 14 of this cooker forms a water receptacle which extends beyond the sides of the body and is provided with openings for receiving steam conduits 15 which extend upwardly and have their upper end portions communicating with the openings 16 formed in the end portions of the steam chamber 3. A reservoir 17 is provided at one side of the base and communicates with the same as shown at 18 and this reservoir 17 is provided with an open upper end having a head positioned therein so that when the water bottle 19 is put in place, water cannot leak from between the bottle and the reservoir. This bottle is engaged by a support 20 and will thus be securely held in an upright position and prevented from having any tendency to topple over.

The outer jacket 21 of the cooker rests upon the base or boiler 14 and is engaged by the upstanding beads 22 so that this outer jacket will be prevented from accidentally slipping out of place. The jacket may however be easily removed when desired by grasping the handle 23 and drawing the jacket upwardly. At the sides and back, the jacket extends in spaced relation to the walls of the body and this jacket is also spaced above the top of the body thus providing an air chamber. The front wall of the outer jacket provides forward walls for the body and the forward wall of the jacket is provided with openings for communication with the cooking compartment, closure doors 24 being provided to close the cooking compartments when the device is in use and having dampers for permitting the escape of surplus steam and hot air from the compartments.

When this cooker is in use, it is placed upon the stove 25 and water will be poured into the reservoir until the reservoir and base have been filled. The bottle 19 will then be filled and put in place as shown in Fig. 3, the water from the bottle passing down into the reservoir as the water in the boiler is heated and passes up through the conduit 15 in the form of steam. This steam passes into the end compartments of the steam chamber 3 and passes out through the openings 12 and 13 into the upper and lower steam cooking compartments of the cooker. The food which is to be cooked by steam will be placed within the upper and lower steam cooking compartments and the dishes containing food to be cooked by dry heat will be placed in the lower compartment 7. The doors can then be closed and left closed until the cooking has been completed. If desired, valves may be provided in the doors of the upper compartments, so that if an excess quantity of steam enters the compartments or chambers, the surplus steam may pass out through the safety valve. A cooker has thus been provided in which a number of articles may be cooked at the same time, some of the articles being cooked by dry heat and some by steam.

I claim:

1. A cooker comprising a body having a base constituting a water receptacle and having upper and lower steam cooking compartments and a chamber between the cooking compartments having communication with the same, a partition in said lower compartment dividing the same into an upper steam cooking chamber and a lower dry heat cooking chamber, and conduits leading from said water receptacle outside said body and communicating with said steam chamber.

2. A cooker comprising a body having a base constituting a water receptacle and having upper and lower cooking compartments and a steam chamber between the cooking compartments divided intermediate its width to provide end compartments communicating one with the upper cooking compartment and the second with the lower cooking compartment, conduits leading from said water receptacle to the end compartments of said steam chamber, and an outer jacket for said body.

3. A cooker comprising a body including upper and lower cooking compartments, a steam chamber between said cooking compartments having communication with the same, a base for said body forming a water receptacle for holding water to be boiled, steam conduits leading from said base and communicating with said steam chamber, a jacket for said body positioned about the same in spaced relation and resting upon said base, the base being provided with an upstanding bead for engaging the jacket and holding the same against sliding movement upon said base, and a water reservoir having communication with the interior of said base.

4. A cooker comprising a body including upper and lower cooking compartments, a base for said body constituting a receptacle for holding water to be boiled, a steam chamber between said cooking compartments having communication with the same, and means for conducting steam from said base and feeding the steam into said steam chamber.

In testimony whereof I have hereunto set my hand.

OLIVE FISHER.